Dec. 10, 1946.   J. A. PETRIE   2,412,533
DAMPING ARRANGEMENT FOR VEHICLE SUSPENSION SYSTEMS
Filed May 7, 1945
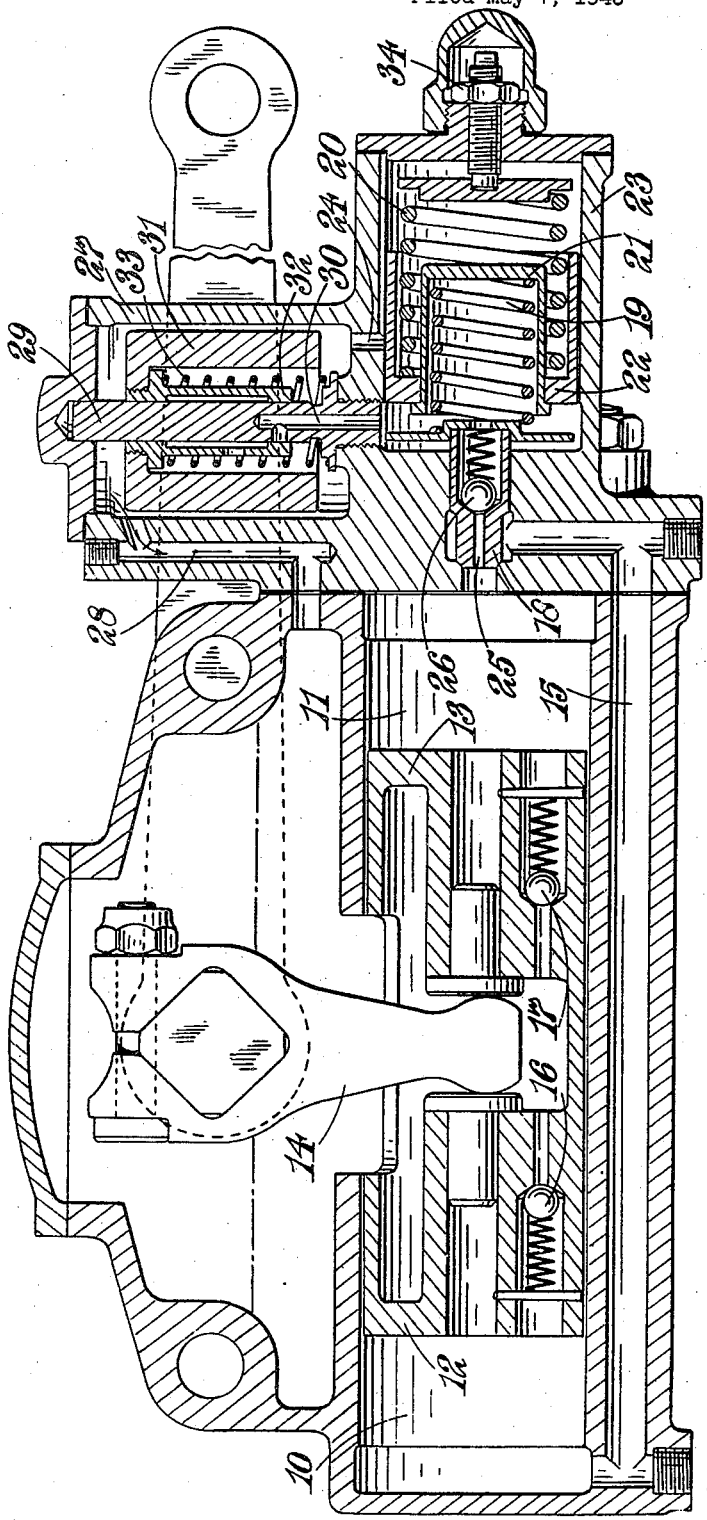
Inventor,
James A. Petrie
By
Young, Emery & Thompson
Attys.

Patented Dec. 10, 1946

2,412,533

UNITED STATES PATENT OFFICE 2,412,533

DAMPING ARRANGEMENT FOR VEHICLE SUSPENSION SYSTEMS

James Alexander Petrie, Derby, England

Application May 7, 1945, Serial No. 592,396
In Great Britain May 22, 1944

5 Claims. (Cl. 188—88)

This invention is for improvements in or relating to damping arrangements for vehicle suspension systems, and has for one of its objects to enable a vehicle to ride over varying road surfaces more smoothly than is possible with either a non-adjustable or manually adjustable damping system. As aircraft travel along the ground in taking-off and landing, the term "vehicle" is to be interpreted as including aircraft.

Hydraulic shock absorbers for vehicle suspension systems have been proposed in which the movement of a damping piston (which is coupled to a part of the vehicle which moves under shock relatively to another part of the vehicle to which latter the piston cylinder is connected) is used to vary the cross-sectional area of a passage through which the damping fluid is forced, in such manner that for light shocks causing little displacement of the piston the intensity of the damping effect is subjected to little, if any, change, whereas for heavier shocks causing greater displacement of the piston the intensity of the damping effect is correspondingly increased.

Double-acting hydraulic shock absorbers for vehicles have also been proposed in which there are two aligned cylinders in which opposed pistons are reciprocated by a rock arm. As the pistons move, they cause damping liquid to pass from the one cylinder to the other through a passage which has a constriction somewhere in it. Leakage from the cylinders is automatically made up from a recuperator chamber through valve-controlled passages.

According to the primary feature of the present invention there is provided a vehicle shock absorber in which fluid friction is employed for damping, comprising the combination of a main cylinder the ends of which are connected by a conduit for the damping fluid, a main piston reciprocable in said cylinder to force the damping fluid through said conduit, a damping valve controlling the rate of flow of the fluid through said conduit, means for applying a closing load to said damping valve, means for progressively unloading the said valve down to a predetermined degree and means responsive to major vehicle shocks caused by travel over major irregularities for progressively restoring said closing load to an appropriate degree. Thus it will be seen that the movement of the damping fluid by the main piston is constricted by a damping valve which is automatically controlled in such a manner that a variable closing pressure is applied to it according to the condition of the surface over which the vehicle is travelling. Preferably the said unloading means are responsive to movements of the vehicle axles.

The said closing load may be applied by a spring through a controlling piston which is exposed to unloading pressure from damping fluid pumped against it past a non-return valve by the reciprocation of the said main piston, and conveniently the said non-return valve controls a passage through the body of the damping valve. There may also be combined with the said controlling piston an inertia-controlled spill valve which is responsive to major vehicle shocks caused by travel over major irregularities and is adapted to relieve the said unloading pressure from the controlling piston. Thus the shock absorber is made self-adjusting, automatically freeing itself to allow the road wheels to follow minor irregularities in the road, but by the operation of the inertia-controlled spill valve becoming effective with increasing intensity should the chassis begin to bounce or pitch on its springs, until such bouncing or pitching is damped out.

For a more complete understanding of the invention, there will now be described, by way of example only and with reference to the accompanying drawing, one construction of shock absorber according to the invention. It is to be understood, however, that the invention is not restricted to the precise constructional details set forth.

The single figure is more or less diagrammatic and is mainly in section.

The double-acting shock absorber shown in the drawing comprises two aligned main cylinders 10 and 11 in which opposed main pistons 12 and 13 are reciprocated by a rock arm 14. As the pistons 12 and 13 move, they cause oil or like damping fluid to pass from the cylinder 10 to the cylinder 11 or vice versa through a conduit 15 controlled by a damping valve 18. The space in the shock absorber casing above and around the cylinders 10 and 11 constitutes a recuperator chamber which is automatically drawn upon through valves 16 and 17 to prevent the formation of air gaps in the cylinders 10 and 11 and conduit 15.

The damping valve 18 is urged towards closing position by a spring 19 and a spring 20, the former of which is enclosed in a flanged shell 21. The spring 20 acts against a controlling piston 22 which bears against the flange on the shell 21 and moves in a cylinder 23 having a port 24. The damping valve 18 has a port 25 in it which can be closed by a spring-pressed non-return valve 26.

One end of the damping valve 18 is exposed to the pressure in the cylinder 11 and an annular shoulder on the valve is exposed to the pressure in the conduit 15 and thus to the pressure in the cylinder 10.

Above the cylinder 23 is another cylinder 27 which communicates by a passage 28 with the aforesaid recuperator chamber. The cylinder 27 has a central stem 29 with a passage 30 in it connecting the interiors of the cylinders 23 and 27. The stem 29 serves to guide a weight 31 which is screwed on to the upper end of a spill valve 32 and constitutes an inertia member. A spring 33 opposes the weight 31 and co-operates with it to tend to maintain the valve 32 in position to close the passage 30, but excessive jolting or bouncing of the vehicle will cause the inertia-controlled spill valve 32 to open the said passage.

When the vehicle is at rest the two springs 19 and 20 in the cylinder 23 are in equilibruim and applying the maximum load to the damping valve 18. When the vehicle is in motion any upward movement of the axle pumps oil past the non-return valve 26 causing the controlling piston 22 to be displaced to the right against the spring 20. This unloads the damping valve 18 to what may be termed the "soft-riding" position by relieving the spring pressure on the damping valve 18. There is a slight back oil pressure on the valve 18 when this occurs, but it is small in comparison with the reduction in spring load. The controlling piston 22 can be displaced until the port 24 is uncovered where it remains, passing excess oil back to the recuperator chamber. This is the position of "maximum softness" of damping. Thus axle movements alone as distinct from chassis movements progressively unload the damping valve 18 down to a predetermined degree.

When the axle movements are violent enough or of such a frequency as to build up appreciable disturbances in the chassis, the spill valve 32, controlled by the inertia of the small spring-mounted weight 31, is opened, by the relative movement between the chassis and the weight, which tends to remain static. This discharges oil from the cylinder 23 through the passage 30 back to the recuperator chamber, thereby allowing the spring-pressure to build up again on the damping valve 18.

The inertia-controlled spill valve 32 is so designed that above a predetermined disturbance of the chassis it can spill oil faster than the non-return valve 26 can supply it, in which case the maximum spring load is applied to the damping valve 18; hence maximum damping becomes effective. An additional adjustment is provided at 34 for the springs 19 and 20, to control the maximum resistance of the damping valve 18.

Oil passed from the main cylinder 11 past the valve 26 is made up by oil drawn from the recuperator chamber via the valve 17. The valve 16 attends only to leakage from the main cylinder 10. The valve 17 must be capable of passing somewhat more oil than can be passed by the valve 26, plus leakage.

The shock absorber can be maintained in the "soft" condition because oil pumped past the non-return valve 26 cannot escape from the cylinder 23 until the controlling piston 22 uncovers the port 24 by moving to the right, providing, of course, that the inertia-controlled spill valve 32 is not disturbed. In this condition the spring 19 is in its weakest setting, applying the minimum load to the damping valve 18.

The non-return valve 26 is opened only by pressure in the main cylinder 11, which is effective on upward movement of the vehicle axle. It is, however, not so much provided to be relief valve for the main cylinder 11, as to be a non-return valve for the cylinder 23. Oil from the main cylinder 10 has first to pass into the cylinder 11 before it can pass the non-return valve 26. This arrangement was chosen because a smaller damping force is required on the upward motion of the axle than on the rebound. The non-return valve 26 does, however, incidentally serve as a relief valve for upward axle movements. The shock absorber resistance may always be varying while the car is in motion, being a function of axle movement tending to unload and chassis movement tending to load it.

The general "ride" characteristics of the vehicle are determined initially by the rating of the spring 33 carrying the inertia member 31, a soft spring being used for "hard" riding and vice versa. The whole is kept immersed in oil as shown to provide a constant degree of damping for this member by oil viscosity. Changes in the oil viscosity, due to temperature changes or other causes, are compensated. The less viscous the oil is, the greater is the tendency to leakage from the cylinder 23 and the resistance to movement of the valve 32 offered by the oil is reduced. A tendency to increase the load on the damping valve results, thus maintaining the shock absorption at the desired degree. Furthermore, the constant circulation of the oil will help to keep the shock absorber cool.

From the foregoing it will be seen that the self-adjusting shock absorber according to the present invention improves the comfort and safety of a vehicle by minimising bouncing and pitching tendencies of the chassis, and that the damping force increases in proportion to the disturbances. The sensitivity to chassis movement is better than with previously proposed inertia-controlled systems, because the inertia member in the present invention governs the damping valve through, what may be regarded as a low-pressure relay, and can therefore be small with a small amplitude of movement. This relay system protects the damping valve from erratic and non-synchronous movements of the inertia member and promotes smooth working of the shock absorber. The shock absorber is entirely self-contained and free from extraneous manual and other forms of voluntary control during travel, with their complication and distraction to the driver. On good roads the shock absorber is normally kept in the "soft" condition by slight pumping action, thereby permitting the axles to follow unexpected irregularities with the minimum of interference to the chassis. Upward movement of the axle always tends to unload the damping valve. Finally it may be mentioned that there is no danger of relay oil flooding the shock absorber, as there is with certain previously proposed pump-operated systems external to the shock absorber.

It is to be understood that the invention is not restricted to the precise constructional details set forth.

I claim:
1. A vehicle shock absorber in which fluid friction is employed for damping, comprising the combination of a main cylinder the ends of which are connected by a conduit for the damping fluid, a main piston reciprocable in said cylinder to force the damping fluid through said conduit, a damping valve controlling the rate of flow of the fluid through said conduit, means for progressively unloading the said valve down to a predetermined degree, and means responsive to vehicle shocks caused by travel of the vehicle for progressively restoring the closing load on the valve.

2. A vehicle shock absorber in which fluid friction is employed for damping, comprising the combination of a main cylinder the ends of which are connected by a conduit for the damping fluid, a main piston reciprocable in said cylinder to force the damping fluid through said conduit, a damping valve controlling the rate of flow of the fluid through said conduit, means responsive to movements of the vehicle axles for progressively unloading the said valve down to a predetermined degree, and means responsive to vehicle shocks caused by travel of the vehicle for progressively restoring the closing load on the valve.

3. A vehicle shock absorber in which fluid friction is employed for damping, comprising the combination of a main cylinder the ends of which are conected by a conduit for the damping fluid, a main piston reciprocable in said cylinder to force the damping fluid through said conduit, a damping valve controlling the rate of flow of the fluid through said conduit, a controlling piston and a spring co-operating therewith for applying a closing load to said damping valve, a non-return valve controlling a passage through which, past the non-return valve, damping fluid is pumped against the controlling piston by the reciprocation of the said main piston to progressively unload the damping valve down to a predetermined degree, and means responsive to vehicle shocks caused by travel of the vehicle for progressively restoring said closing load on the valve.

4. A vehicle shock absorber in which fluid friction is employed for damping, comprising the combination of a main cylinder the ends of which are connected by a conduit for the damping fluid, a main piston reciprocable in said cylinder to force the damping fluid through said conduit, a damping valve controlling the rate of flow of the fluid through said conduit, a controlling piston and a spring co-operating therewith for applying a closing load to said damping valve, a non-return valve controlling a passage through the body of the damping valve through which passage, past the non-return valve, damping fluid is pumped against the controlling piston by the reciprocation of the said main piston to progressively unload the damping valve down to a predetermined degree, and means responsive to vehicle shocks caused by travel of the vehicle for progressively restoring said closing load on the valve.

5. A vehicle shock absorber in which fluid friction is employed for damping, comprising the combination of a main cylinder the ends of which are connected by a conduit for the damping fluid, a main piston reciprocable in said cylinder to force the damping fluid through said conduit, a damping valve controlling the rate of flow of the fluid through said conduit, a controlling piston and a spring co-operating therewith for applying a closing load to said damping valve, a non-return valve controlling a passage through which, past the non-return valve, damping fluid is pumped against the controlling piston by the reciprocation of the said main piston to progressively unload the damping valve down to a predetermined degree, and an inertia-controlled spill valve which is responsive to major vehicle shocks caused by travel of the vehicle and is adapted to relieve the said unloading pressure from the controlling piston.

JAMES ALEXANDER PETRIE.